United States Patent
Yokouchi

(10) Patent No.: US 6,492,994 B2
(45) Date of Patent: *Dec. 10, 2002

(54) IMAGE EDITING METHOD AND APPARATUS AND IMAGE COMPOSING METHOD AND APPARATUS

(75) Inventor: Kouji Yokouchi, Kanagawa-ken (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,927

(22) Filed: Mar. 31, 1999

(65) Prior Publication Data

US 2002/0135599 A1 Sep. 26, 2002

(30) Foreign Application Priority Data

Mar. 31, 1998 (JP) .............................. 10-087146

(51) Int. Cl.[7] ............................. G09G 5/00; G09G 5/26; G06H 15/00; G06F 15/34; H04N 1/36
(52) U.S. Cl. ...................... 345/619; 345/660; 345/668; 345/670; 345/671; 348/441; 348/581; 358/450; 358/452; 382/298; 382/299
(58) Field of Search ................................ 345/435, 433, 345/439, 469, 115, 116, 127, 129, 130, 131, 132, 133, 660, 668, 669–671, 472–472.2; 348/441, 445, 581, 589, 600, 239; 358/1.6, 1.18, 448–449, 450–451, 452, 455; 382/298, 295

(56) References Cited

U.S. PATENT DOCUMENTS

| | | | | | |
|---|---|---|---|---|---|
| 5,121,448 A | * | 6/1992 | Katayama | ..................... | 382/67 |
| 5,239,625 A | * | 8/1993 | Bogart | ..................... | 395/128 |
| 5,263,136 A | * | 11/1993 | DeAguiar | ..................... | 395/164 |
| 5,325,108 A | * | 6/1994 | Salam | ..................... | 345/108 |
| 5,436,734 A | * | 7/1995 | Yamauchi | ..................... | 358/448 |
| 5,729,255 A | * | 3/1998 | Aoki | ..................... | 345/128 |
| 5,923,013 A | * | 6/1999 | Suzuki et al. | ..................... | 235/375 |
| 5,978,551 A | * | 11/1999 | Koyama | ..................... | 395/102 |
| 6,034,785 A | * | 3/2000 | Itoh | ..................... | 358/1.18 |
| 6,100,919 A | * | 8/2000 | Inoue | ..................... | 348/46 |
| 6,124,841 A | * | 9/2000 | Aoyama | ..................... | 345/127 |

* cited by examiner

Primary Examiner—Matthew Luu
Assistant Examiner—Wesner Sajous
(74) Attorney, Agent, or Firm—Birch, Stewart, Kolasch & Birch, LLP

(57) ABSTRACT

Upon composing characters with an image, character images in an image for editing and in a composite image agree. When characters are composed with a low resolution image represented by low resolution image data, character image generating means generates enlarged character image data from a character image to be composed with, and 1/n reduction means obtains reduced character image data by reducing the enlarged character image data by 1/n. Editing means generates an image for editing by using the reduced character image data and the low resolution image data. The editing procedure and the enlarged character image data are recorded in an editing description file. Based on the editing description file, composition means in an image server generates composite image data by using the enlarged character image data and high resolution image data. The composite image data are output as a printed image by image outputting means.

11 Claims, 4 Drawing Sheets

FIG.5A  TEST  48 POINT

FIG.5B  TEST  12×4 POINT

IMAGE EDITING METHOD AND APPARATUS AND IMAGE COMPOSING METHOD AND APPARATUS

BACKGROUND OF THE INVENTION

1. Field of the Invention

The present invention relates to an image editing method and apparatus for obtaining an image for editing by composing a character image with a low resolution image, and also to an image composing method and apparatus for obtaining a composite image by composing a character image with an original high resolution image.

2. Description of the Related Art

A printing service for printing a composite image has been in practice. In this service, among image data coded hierarchically from low resolution to high resolution, editing operations such as composition with a character image are carried out on the low resolution image data, and this editing procedure on the low resolution image is recorded in an editing description file. This editing description file is transferred to an image server via a network, and processing such as composition with a character image is carried out on the high resolution image according to the procedure by an image composing computer in the image server. A composite image is then printed.

In such a service, when the character image is composed with the low resolution image, the kind of low resolution image, a position at which the character image is inserted, and font information (such as the content of the characters and the size thereof) are recorded in the editing description file. The character image is generated by the image composing computer in the image server using a font of a size suitable for the high resolution image, based on the font information. The character image is then inserted into the high resolution image at the position corresponding to that of the low resolution image, and the composite image is generated as a result. For example, when the low resolution image is an image having a reduction ratio of 1/4 of the high resolution image and the font of the characters inserted in the low resolution image is of 20 point, the image server generates the character image using a font of 20×4=80 point, and inserts the character image in the high resolution image.

However, in a character image composed of x-point characters and having a size of H1×W1 as shown in FIG. 4(A) and in a character image composed of characters of x×n point and having a size of H2×W2, H2/H1=n or W2/W1=n as shown in FIG. 4(B) is not necessarily true. Actually, it is often found that the above relations are not satisfied. This is because a character of a font having a large point number is generated from vector information, while a character of a font having a small point number is pre-stored as an image and not generated from vector information. For example, a 48-point character shown in FIG. 5(a) is different in width, height, and line thickness from a 12-point character magnified by 4 shown in FIG. 5(b). Therefore, if a character image composing a font of a point number in accordance with a magnification between the high and low resolution images is inserted in a high resolution image, the position of the character image is different from an image for editing, and the image to be printed is not in accordance with the image for editing, due to the character image extending beyond the high resolution image, for example.

Furthermore, when characters of a special font are inserted in the low resolution image upon editing, the font may not be supported by the image server. In such a case, the image server cannot compose the character image requested by a user with the high resolution image.

SUMMARY OF THE INVENTION

Based on consideration of the above problems, an object of the present invention is to provide an image editing method and apparatus as well as an image composing method and apparatus, for matching up a composite image with an image for editing.

An image editing method of the present invention is an image editing method for carrying out composition of a character image with a low resolution image generated by reducing an original image by a predetermined ratio, and comprises the steps of:

generating an enlarged character image by enlarging the character image based on the predetermined ratio;

generating a reduced character image by reducing the enlarged character image based on the predetermined ratio; and generating an image for editing by composing the reduced character image with the low resolution image.

"Enlarging the character image based on the predetermined ratio" means to enlarge the image by a magnification of n if the predetermined ratio is 1/n.

It is preferable for the image editing method of the present invention to output the enlarged character image and information regarding the low resolution image as an editing description file.

The "information regarding the low resolution image" herein referred to means the kind of low resolution image, a position at which the character image is inserted, font information (the content and the size of the characters), and the like.

An image composing method of the present invention obtains a composite image by composing the enlarged character image with the original image, based on the editing description file output by the image editing method of the present invention.

An image editing apparatus of the present invention is an apparatus for carrying out composition of a character image with a low resolution image generated by reducing an original image by a predetermined ratio, and comprises:

enlarged character image generating means for generating an enlarged character image by enlarging the character image based on the predetermined ratio;

reduced character image generating means for generating a reduced character image by reducing the enlarged character image based on the predetermined ratio; and editing means for generating an image for editing by composing the reduced character image with the low resolution image.

It is preferable for the image editing apparatus of the present invention to further comprise output means for outputting the enlarged character image and information regarding the low resolution image as an editing description file.

An image composing apparatus of the present invention comprises composition means for obtaining a composite image by composing the enlarged character image with the original image, based on the editing description file output by the image editing apparatus of the present invention.

Upon generation of the image for editing through composition of the character image with a low resolution image generated by reducing the original image by the predetermined ratio, the image editing method and apparatus of the present invention enlarges the character image to a size appropriate for the original image, and reduces the enlarged character image by the predetermined ratio to compose the reduced character image with the low resolution image. Since the reduced character image is generated by reducing the enlarged character image by the predetermined ratio corresponding to a ratio between the original image and the low resolution image, a ratio between the width and height of the reduced character image is approximately the same as in the enlarged character image. Therefore, between the image for editing and the composite image obtained by insertion of the enlarged character image with the original image, the ratio of width and height of the character image and the position of the character image are approximately the same and the two images agree.

When the image composition is carried out by using the enlarged character image, the enlarged character image and the information regarding the low resolution image are output as the editing description file, and the composite image is obtained through composition of the enlarged character image with the original image carried out by the image composing method and apparatus of the present invention, based on the editing description file.

BRIEF DESCRIPTION OF THE DRAWINGS

FIGS. 4 and 5 are diagrams for explaining problems of a conventional method, wherein FIG. 5(A) shows a 48-point character, and FIG. 5(B) shows a 12-point character magnified by 4.

DESCRIPTION OF THE PREFERRED EMBODIMENT

Hereinafter, an embodiment of the present invention will be explained with reference to the accompanying drawings.

Figure 1:
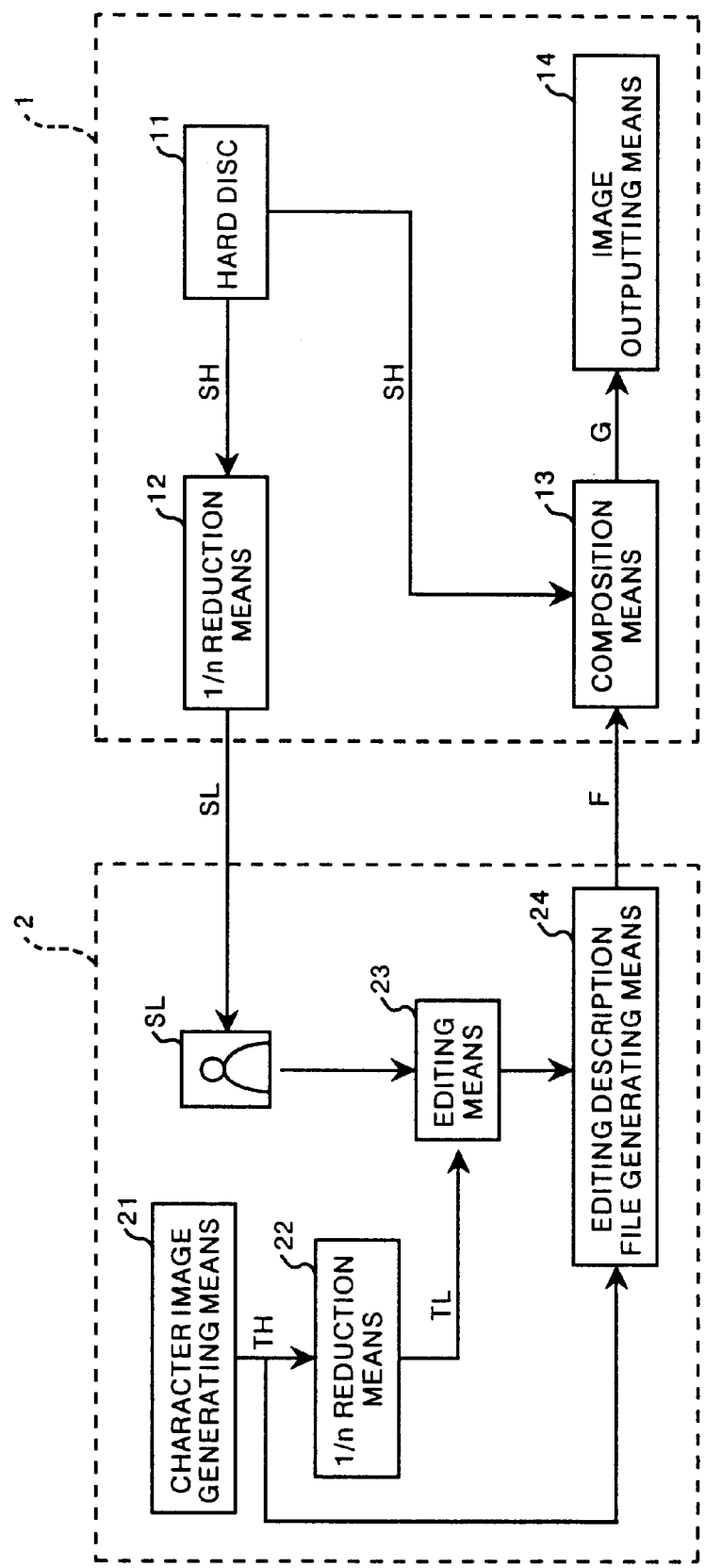
FIG. 1 is a block diagram showing an outline configuration of an image composing system adopting an image editing apparatus and an image composing apparatus as an embodiment of the present invention.

FIG. 1 is a block diagram showing an outline of an image composing system using an image editing apparatus and image composing apparatus as the embodiment of the present invention. As shown in FIG. 1, the image composing system in this embodiment comprises an image server 1 adopting the image composing apparatus of the present invention, and a personal computer 2 which is owned by a user and adopts the image editing apparatus of the present invention. The image server 1 and the personal computer 2 are connected via a network.

The image server 1 comprises a hard disc 11 storing high resolution image data SH, 1/n reduction means 12 for obtaining low resolution image data SL by reducing the high resolution image data SH to 1/n of the original size, composition means 13 for obtaining composite image data G by composing a high resolution image represented by the high resolution image data SH with a character image based on an editing description file F which will be explained later, and image outputting means 14 for outputting the composite image data G as a print.

The personal computer 2 comprises character image generating means 21 for generating enlarged character image data TH representing an enlarged character image generated by enlargement of a character image to be composed with the low resolution image data SL by a magnification of n, 1/n reduction means 22 for obtaining reduced character image data TL by reducing the enlarged character image data TH by 1/n, editing means 23 for obtaining an image for editing by composing a reduced character image represented by the reduced character image data TL with a low resolution image represented by the low resolution image data SL, and editing description file generating means 24 for generating the editing description file F based on an editing procedure carried out by the editing means 23 and on the enlarged character image data TH generated by the character image generating means 21.

Figure 2:
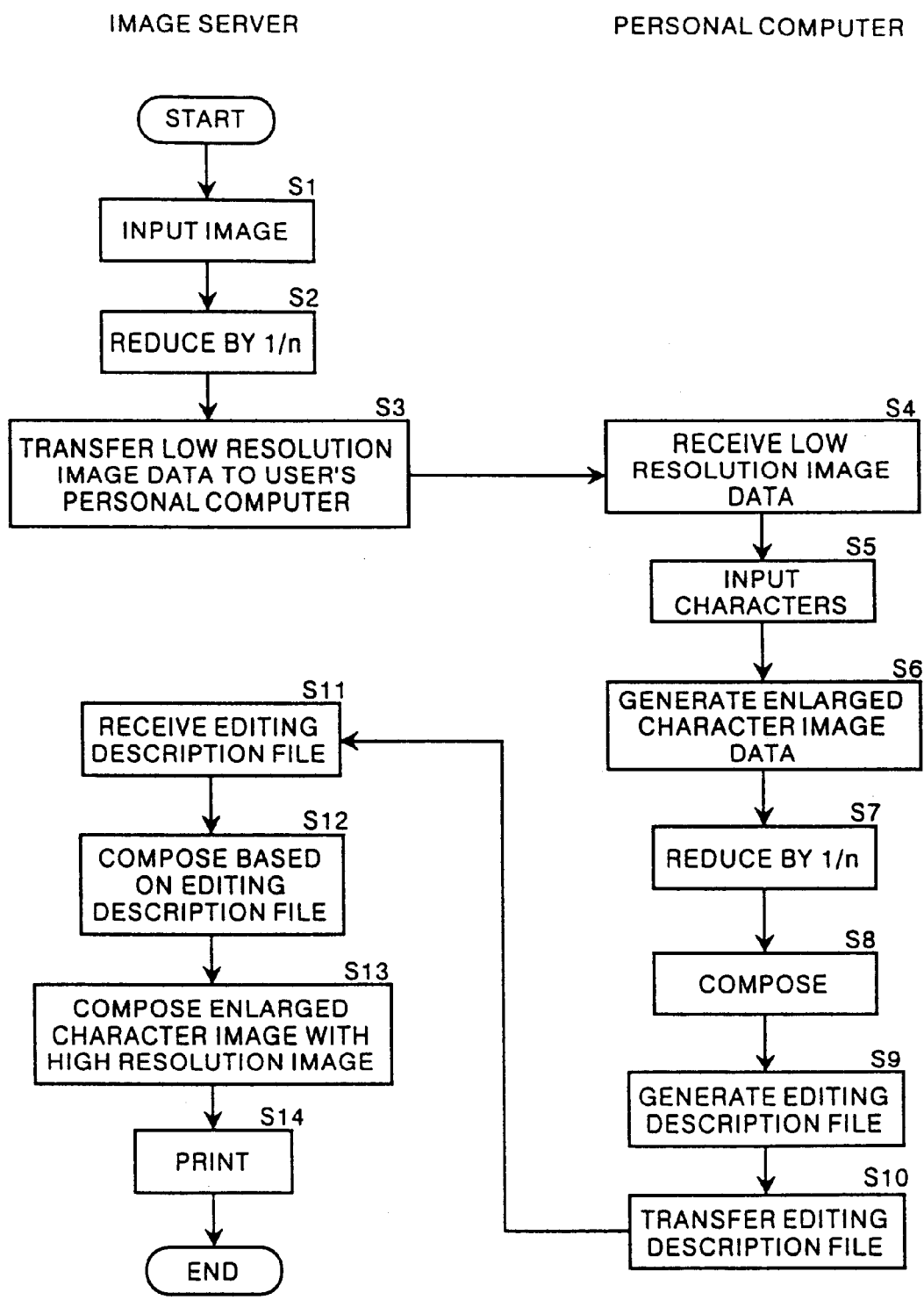
FIG. 2 is a flow chart showing processing carried out in the embodiment of the present invention.

An operation of the image composing system in this embodiment will be explained next. In this embodiment, the sizes of the high resolution image and the image for editing are 400×400 and 100×100 respectively, while the sizes of fonts for the enlarged character image to be composed with the high resolution image and for the reduced character image to be composed with the image for editing are 80 and 20 respectively. FIG. 2 is a flow chart explaining the operation of the system.

At Step S1, the high resolution image data SH are input to the hard disc 11 of the image server 1. The high resolution image data SH are reduced by 1/n (1/4 in this case) at Step S2 to generate the low resolution image data SL. At Step S3, the low resolution image data SL are transferred to the personal computer 2 of the user via the network.

The personal computer 2 of the user receives the low resolution image data SL at Step S4, and the editing means 23 displays the low resolution image data SL as the low resolution image on a monitor which is not shown in FIG. 1. At Step S5, the user inputs characters to be composed with the image by using input means such as a keyboard. The character image generating means 21 generates, at Step S6, the enlarged character image data TH representing the character image by using a font whose point number is n (4) times the point number of the input characters.

At Step S7, the reduced character image data TL are generated by reduction of the enlarged character image data TH by 1/n (1/4). The reduced character image data TL are input to the editing means 23 and the image for editing is obtained by composition of the reduced character image represented by the reduced character image data TL with the low resolution image at Step S8. On this occasion, image composition using a part such as a template is also carried out. An example of the image for editing is shown in FIG. 3(*a*). The editing procedure carried out here is recorded by the editing description file generating means 24 at Step S9 to generate the editing description file F representing a result of editing. The enlarged character image data TH are also recorded in the editing description file F. At Step S10, the editing description file F is transferred to the image server 1 via the network.

The image server 1 receives the editing description file F at Step S11. At Step S12, the composition means 13 composes the high resolution image represented by the high resolution image data SH with a template and the like based on the editing procedure included in the editing description file F. At Step S13, the enlarged character image represented by the enlarged character image data TH included in the editing description file F is composed with the high resolution image to generate the composite image data G. The image represented by the composite image data G is shown in FIG. 3(*b*). Between the composite image shown in FIG.

Figure 3A:
FIG. 3(A) is a diagram showing an image for editing.
Figure 3B:
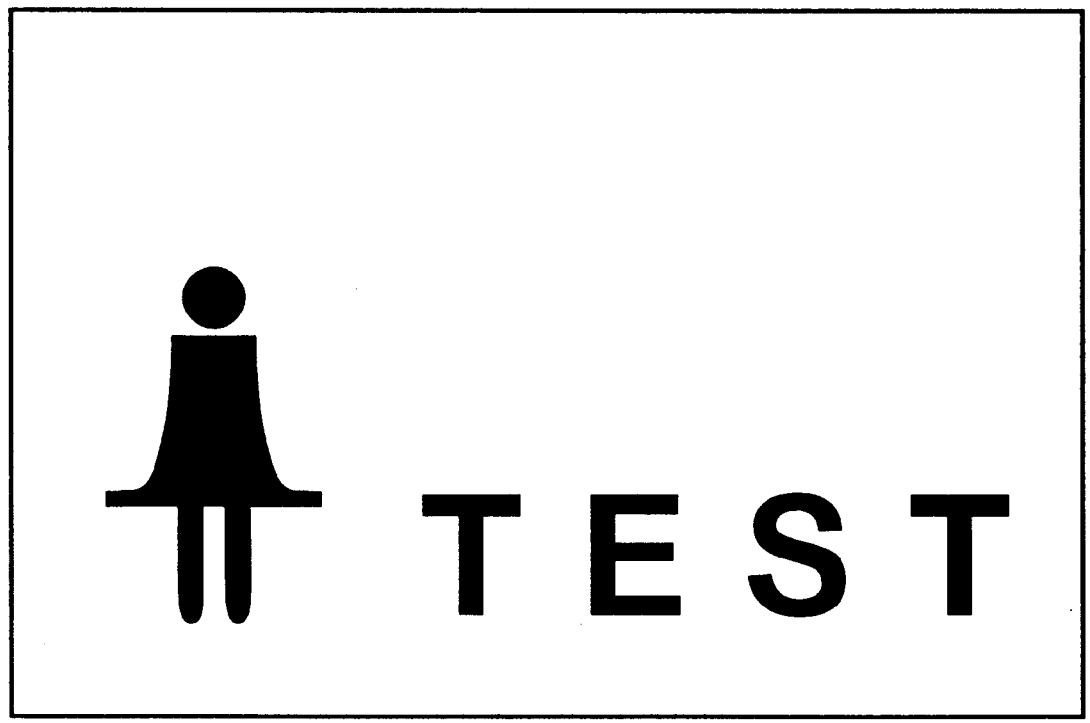
FIG. 3(B) is a diagram showing a composite image.
Figure 4A:
FIG. 4(A) shows a character image composed of x-point characters and having a size of H1×W1.
Figure 4B:
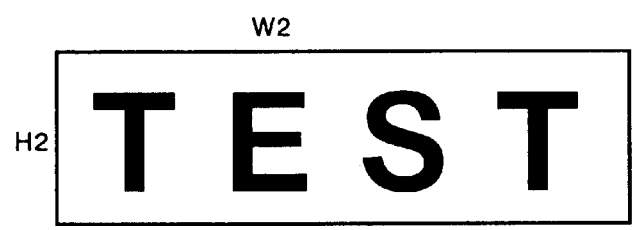
FIG. 4(B) shows a character image composed of characters of x×n point and having a size of H2×W2.

3(b) and the image for editing shown in FIG. 3(a), the length and the insertion positions of the character images approximately agree. At Step S14, the image outputting means 14 outputs the composite image data G as a printed image, and the processing is finished.

As has been described in the above, in this embodiment, the character image generating means 21 generates the enlarged character image data TH by enlarging the characters to be inserted into the image for editing, and the reduced character image data TL are generated by reducing the enlarged character image data TH. The image for editing is then generated by insertion of the reduced character image represented by the reduced character image data TL. The composite image is generated by using the enlarged character image data TH. Therefore, a difference in the ratio of the height and width of the character images due to a difference of the point numbers of fonts, or a difference in position of the character image between the composite image and the image for editing are not observed, and the character image in the composite image agrees with the character image in the image for editing.

Furthermore, in the case where the image for editing is generated by the personal computer 2 by using a special font, the enlarged character image data based on the font can be generated and included in the editing description file F. Therefore, the image server 1 can compose the character image in the special font with the high resolution image by using the enlarged character image data. In this manner, the case where the image server 1 does not have the special font can also be dealt with.

In this embodiment, the image composing apparatus in the image server 1 and the image editing apparatus of the personal computer 2 are hardware, but can also be implemented as software.

What is claimed is:

1. An image editing method for carrying out composition of a character image with a low resolution image generated by reducing an original image by a predetermined ratio, the image editing method comprising the steps of:
   generating an enlarged character image by enlarging the character image based on the predetermined ratio;
   generating a reduced character image by reducing the enlarged character image based on the predetermined ratio;
   generating an image for editing by composing the reduced character image with the low resolution image;
   outputting the enlarged character image and information regarding the low resolution image as an editing description file; and
   composing the enlarged character image with the original image, based upon the editing description file.

2. An image editing apparatus for carrying out composition of a character image with a low resolution image generated by reducing an original image by a predetermined ratio, the image editing apparatus comprising:
   enlarged character image generating means for generating an enlarged character image by enlarging the character image based on the predetermined ratio;
   reduced character image generating means for generating a reduced character image by reducing the enlarged character image based on the predetermined ratio;
   editing means for generating an image for editing by composing the reduced character image with the low resolution image;
   output means for outputting the enlarged character image and information regarding the low resolution image as an editing description file; and
   composition means for obtaining a composite image by composing the enlarged character image with the original image, based on the output editing description file.

3. An image editing apparatus for composition of a character image with a low resolution image generated by reducing an original image by a predetermined ratio, the image editing apparatus comprising:
   a display;
   a memory; and
   a processor coupled to the memory and the display, the processor configured to:
     generate an enlarged character image by enlarging the character image based on the predetermined ratio;
     reduce character image by reducing the enlarged character image based on a predetermined ratio;
     generate a reduced character image by reducing the enlarged character image based on the predetermined ratio;
     generate an image for editing by composing a reduced character image with the low resolution image;
     output the enlarged character image and information regarding the low resolution image as an editing description file; and
     compose the enlarged character image with the original image based on the output editing description file.

4. An image editing method for composing character image data with a low resolution image, the method comprising:
   receiving a low resolution image;
   generating a character image wherein information in the character image is to be composed with the low resolution image;
   enlarging the character image by a predetermined ratio;
   reducing the enlarged character image by a predetermined ratio;
   generating an image for editing by composing the reduced character image with the low resolution image;
   creating an editing description file including information regarding the enlarged character image and the low resolution image; and outputting the editing description file.

5. An image editing method for composing character image data with original image data, the method comprising:
   retrieving original image data;
   reducing the original image data by a predetermined ratio;
   transmitting the reduced image data;
   receiving an editing description file including information regarding enlarged character image data and the reduced image data;
   composing the enlarged character image data with the original image data; and
   outputting the composed data.

6. An image editing apparatus for composing character image data with a low resolution image comprising:
   a receiver for receiving a low resolution image;
   a generating module for generating a character image wherein information in the character image is to be composed with the low resolution image;
   an enlarging module for enlarging the character image by a predetermined ratio;
   a reducing module for reducing the enlarged character image by a predetermined ratio;
   a generating module for generating an image for editing by composing the reduced character image with the low resolution image;

a creating module for creating an editing description file including information regarding the enlarged character image and the low resolution image; and an outputting module for outputting the editing description file.

7. An image editing apparatus for composing character image data with original image data comprising:

a retrieving module for retrieving original image data;

a reducing module for reducing the original image data by a predetermined ratio;

a transmitting module for transmitting the reduced image data;

a receiving module for receiving an editing description file including information regarding enlarged character image data and the reduced image data;

a composing module for composing the enlarged character image data with the original image data; and an outputting module for outputting the composed data.

8. A computer-readable medium containing instructions for composing character image data with a low resolution image comprising:

receiving a low resolution image;

generating a character image wherein information in the character image is to be composed with the low resolution image;

enlarging the character image by a predetermined ratio;

reducing the enlarged character image by a predetermined ratio;

generating an image for editing by composing the reduced character image with the low resolution image;

creating an editing description file including information regarding the enlarged character image and the low resolution image; and outputting the editing description file.

9. A computer-readable medium containing instructions for composing character image data with original image data comprising:

retrieving original image data;

reducing the original image data by a predetermined ratio;

transmitting the reduced image data;

receiving an editing description file including information regarding enlarged character image data and the reduced image data;

composing the enlarged character image data with the original image data; and outputting the composed data.

10. A system for composing character image data with a low resolution image, the method comprising:

a memory storage device for storing program instructions;

a processor coupled to the memory storage device the processor being operative to receive a low resolution image;

generate a character image wherein information in the character image is to be composed with the low resolution image;

enlarge the character image by a predetermined ratio;

reduce the enlarged character image by a predetermined ratio;

generate an image for editing by composing the reduced character image with the low resolution image;

create an editing description file including information regarding the enlarged character image and the low resolution image; and output the editing description file.

11. A system for composing character image data with original image data, the method comprising:

a memory storage device for storing program instructions;

a processor coupled to the memory storage device the processor being operative to retrieve original image data;

reduce the original image data by a predetermined ratio;

transmit the reduced image data;

receive an editing description file including information regarding enlarged character image data and the reduced image data;

compose the enlarged character image data with the original image data; and output the composed data.

* * * * *